United States Patent
Nicks (10) Patent No.: US 10,479,305 B1
(45) Date of Patent: Nov. 19, 2019

(54) SYSTEM AND METHOD OF DETERMINING A SEAT BACK STATUS OF A PASSENGER SEAT IN A VEHICLE

(71) Applicant: The Boeing Company, Chicago, IL (US)

(72) Inventor: Eric Lee Nicks, Defiance, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/995,235

(22) Filed: Jun. 1, 2018

(51) Int. Cl.
*B60R 21/01* (2006.01)
*B60R 21/015* (2006.01)
*B60R 22/48* (2006.01)
*B64D 11/06* (2006.01)

(52) U.S. Cl.
CPC ............ *B60R 21/01554* (2014.10); *B60R 2022/4808* (2013.01); *B64D 11/0639* (2014.12)

(58) Field of Classification Search
CPC ...... B60R 21/01554; B60R 2022/4808; B64D 11/0639
See application file for complete search history.

(56) References Cited

U.S. PATENT DOCUMENTS

| | | | |
|---|---|---|---|
| 7,253,744 B2 | 8/2007 | Colacecchi | |
| 7,490,572 B2 * | 2/2009 | Grober | B60R 11/04 114/191 |
| 10,093,266 B2 * | 10/2018 | Sugie | B60R 21/01554 |
| 10,150,386 B2 * | 12/2018 | Tan | B60N 2/0244 |
| 2008/0216567 A1 * | 9/2008 | Breed | B60C 11/24 73/146.5 |
| 2012/0089299 A1 * | 4/2012 | Breed | B60C 11/24 701/36 |
| 2014/0316661 A1 * | 10/2014 | Parker | B60N 2/39 701/49 |
| 2016/0101710 A1 * | 4/2016 | Bonk | B60N 2/0252 297/217.2 |
| 2017/0023346 A1 * | 1/2017 | Phillips | G01B 5/24 |
| 2017/0144774 A1 | 5/2017 | Pollard et al. | |
| 2017/0166094 A1 * | 6/2017 | Frye | B60N 2/0248 |
| 2017/0210247 A1 * | 7/2017 | Rao | B60N 2/14 |
| 2017/0210322 A1 * | 7/2017 | Rao | B60R 21/01554 |
| 2017/0269695 A1 * | 9/2017 | Tokish | G06F 3/016 |
| 2018/0272977 A1 * | 9/2018 | Szawarski | B60R 21/01512 |
| 2018/0312093 A1 * | 11/2018 | Vanel | B60N 3/063 |

* cited by examiner

*Primary Examiner* — Rodney A Butler
(74) *Attorney, Agent, or Firm* — Armstrong Teasdale LLP (57) ABSTRACT

A method of determining a seat back status of a passenger seat in a vehicle. The method includes monitoring a seat back orientation sensor coupled to a seat back of the passenger seat and monitoring a reference orientation sensor coupled at a fixed position within the vehicle. The seat back orientation sensor determines an orientation of the seat back relative to Earth, and the reference orientation sensor determines an orientation of the vehicle relative to Earth. The method further includes determining an orientation of the seat back relative to the vehicle based on a comparison between the orientation of the seat back and the orientation of the vehicle relative to Earth, and transmitting seat back orientation data, of the seat back relative to the vehicle, to a remote monitoring unit, wherein the remote monitoring unit is configured to display a first notification when the seat back is not fully upright.

20 Claims, 7 Drawing Sheets

SYSTEM AND METHOD OF DETERMINING A SEAT BACK STATUS OF A PASSENGER SEAT IN A VEHICLE

BACKGROUND

The field of the present disclosure relates generally to reclinable passenger seats in a vehicle and, more specifically, to a system and method that is capable of determining a seat back orientation of the passenger seats regardless of the orientation of the vehicle.

Known commercial aircraft include passenger seats having seat backs that are positionable between a reclined position and a fully upright position. The Federal Aviation Administration (FAA) mandates that the passenger seats on commercial flights be oriented in the fully upright position during takeoff and landing of the aircraft. Currently, flight attendants must walk through a passenger cabin of the aircraft to determine if every passenger seat is in the fully upright position and thus in compliance with FAA regulations. This process may be time-consuming and laborious. In addition, FAA regulations require that the flight attendants be seated and fastened during certain phases of flight, which prevents the flight attendants from constantly monitoring the seat back position of every passenger seat in the vehicle.

BRIEF DESCRIPTION

In one aspect, a method of determining a seat back status of a passenger seat in a vehicle is provided. The method includes monitoring at least one seat back orientation sensor coupled to a seat back of the passenger seat and monitoring at least one reference orientation sensor coupled at a fixed position within the vehicle. The at least one seat back orientation sensor is configured to determine an orientation of the seat back relative to Earth, and the at least one reference orientation sensor is configured to determine an orientation of the vehicle relative to Earth. The method further includes determining an orientation of the seat back relative to the vehicle based on a comparison between the orientation of the seat back and the orientation of the vehicle relative to Earth, and transmitting seat back orientation data, of the seat back relative to the vehicle, to a remote monitoring unit, wherein the remote monitoring unit is configured to display a first notification when the seat back is not fully upright.

In another aspect, a system for use in determining a seat back status of a passenger seat in a vehicle is provided. The system includes at least one reference orientation sensor configured for coupling at a fixed position within the vehicle and a seat back system configured for coupling to a seat back of the passenger seat. The at least one reference orientation sensor is configured to determine an orientation of the vehicle relative to Earth. The seat back system includes at least one seat back orientation sensor configured to determine an orientation of the seat back relative to Earth, and a control unit in communication with the at least one seat back orientation sensor and the at least one reference orientation sensor. The control unit is configured to determine an orientation of the seat back relative to the vehicle based on a comparison between the orientation of the seat back and the orientation of the vehicle relative to Earth. The system also includes a remote monitoring unit configured to receive seat back orientation data, of the seat back relative to the vehicle, from the control unit, wherein the remote monitoring unit is configured to display a first notification when the seat back is not fully upright.

In yet another aspect, a vehicle is provided. The vehicle includes a stationary object, at least one reference orientation sensor coupled to the stationary object, and a plurality of passenger seats that each include a seat bottom and a seat back that is rotatable relative to the seat bottom. The at least one reference orientation sensor configured to determine an orientation of the vehicle relative to Earth. A seat back system coupled to the seat back of each passenger seat. The seat back system includes at least one seat back orientation sensor configured to determine an orientation of the seat back relative to Earth, and a control unit in communication with the at least one seat back orientation sensor and the at least one reference orientation sensor. The control unit is configured to determine an orientation of the seat back relative to the vehicle based on a comparison between the orientation of the seat back and the orientation of the vehicle relative to Earth. The system also includes a remote monitoring unit configured to receive seat back orientation data, of the seat back relative to the vehicle, from the control unit, wherein the remote monitoring unit is configured to display a first notification when the seat back is not fully upright.

DETAILED DESCRIPTION

The implementations described herein relate to a system and method that is capable of determining a seat back orientation of the passenger seats regardless of the orientation of the vehicle. More specifically, the system described herein includes at least one sensor coupled to a seat back of each passenger seat, and at least one sensor coupled at a fixed position within the vehicle. The respective sensors facilitate determining an orientation of the seat backs and an orientation of the vehicle relative to Earth. The determination of the orientation of the vehicle provides a reference orientation that is then used for comparison against the sensed orientation of the seat backs. The comparison results in a determination of the orientation of the seat back relative to the vehicle. As such, the system described herein may be used to accurately determine the orientation of the seat backs in vehicles whose orientation changes during operation, such as an aircraft. In addition, the system can be hidden from the passengers of the vehicle, the system has no impact on the functionality of the passenger seat, and the system is retrofittable on existing passenger seats without impacting the certification of the passenger seats.

The system described herein also includes a remote monitoring unit in communication with the seat back system, and that displays a notification when the seat backs are not fully upright. For example, in one embodiment, the remote monitoring unit displays a seat layout diagram for the aircraft, and each passenger seat in the aircraft is represented on the diagram. As such, the remote monitoring unit provides a centralized data collection and display device that enables a user, such as a flight attendant, to determine the seat back orientations of all passenger seats in the vehicle in a quick and efficient manner.

In some embodiments, the seat back system may also be used to monitor a health status of each of the seat backs, as will be explained in more detail below. When an abnormal health status of one of the seat backs is determined, the remote monitoring unit displays a notification and/or a transmission is sent to a technician such that the seat back is flagged for further inspection. As such, the seat back orientation data can be used to ensure compliance with FAA regulations and to determine if a seat back is in need of repair before regular maintenance is scheduled to be executed.

As used herein, an element or step recited in the singular and proceeded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

Figure 1:
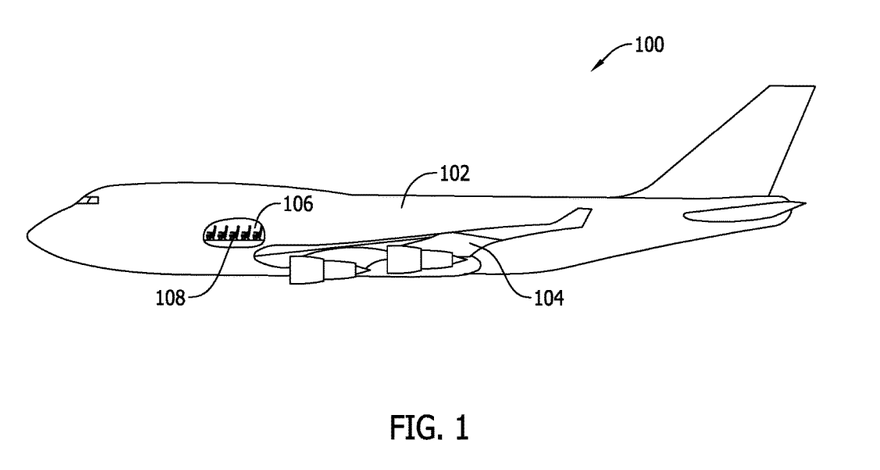
FIG. 1 is a side view illustration of an exemplary vehicle.

FIG. 1 is a side view illustration of a vehicle 100. In the exemplary implementation, vehicle 100 is an aircraft that includes a fuselage 102 and a wing structure 104 extending from fuselage 102. Fuselage 102 defines a passenger cabin 106, and a plurality of passenger seats 108 are positioned within passenger cabin 106.

Figure 2:
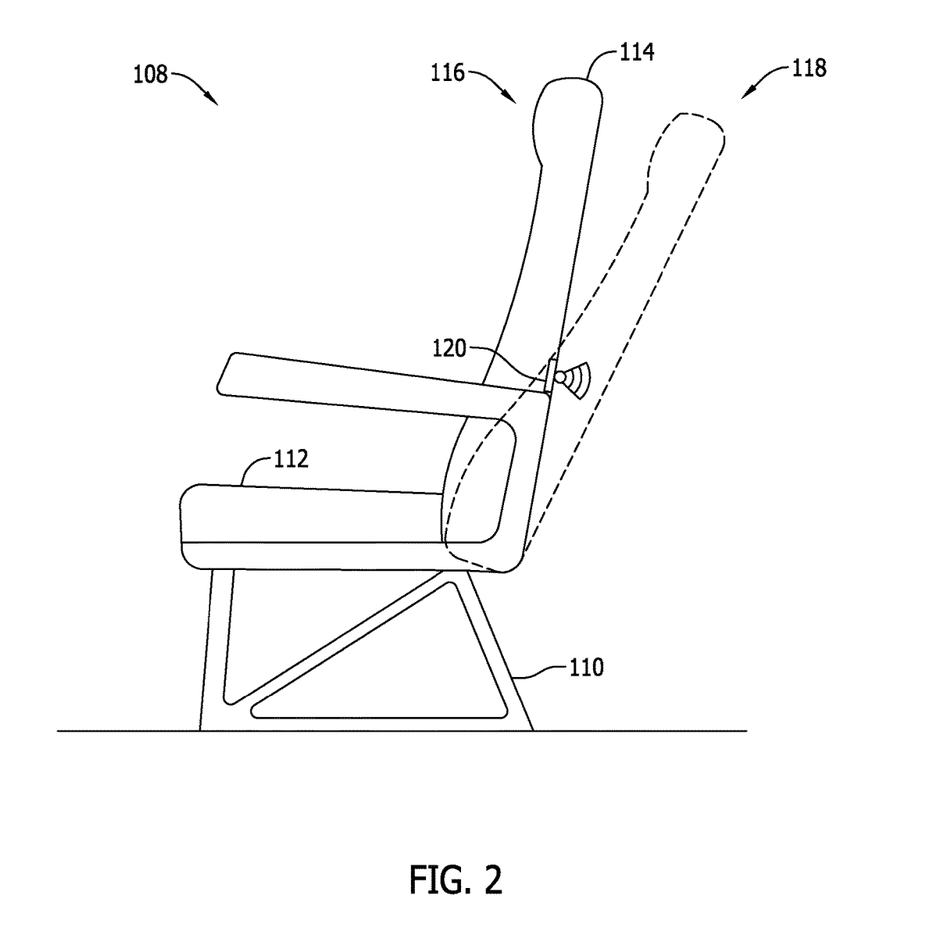
FIG. 2 is a side view illustration of an exemplary passenger seat that may be used in the vehicle shown in FIG. 1.

FIG. 2 is a side view illustration of passenger seat 108. In the exemplary implementation, passenger seat 108 includes a frame 110, a seat bottom 112 coupled to frame 110, and a seat back 114 that is rotatable relative to seat bottom 112. For example, seat back 114 is selectively reclinable for positioning in a fully upright position 116, a fully reclined position 118, and intermediate positions therebetween. Seat back 114 has a seat back system 120 coupled thereto. Seat back system 120 is capable of determining an orientation of seat back 114 relative to Earth, as will be explained in more detail below.

Figure 3:
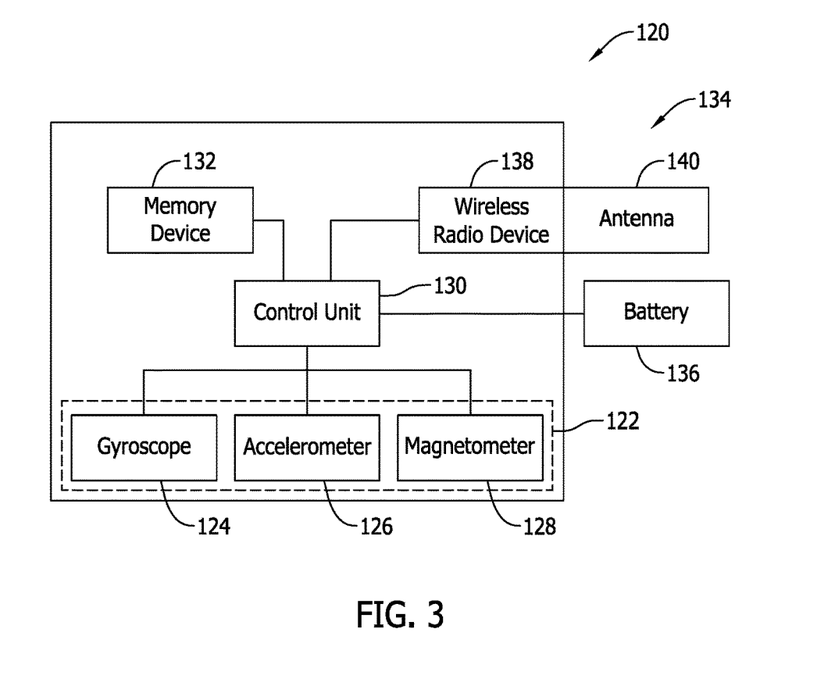
FIG. 3 is a box diagram illustrating an exemplary seat back system that may be used with the passenger seat shown in FIG. 2.

FIG. 3 is a box diagram illustrating seat back system 120 that may be used with passenger seat 108 (shown in FIG. 2). In the exemplary implementation, seat back system 120 includes at least one seat back orientation sensor 122 used to determine an orientation of seat back 114 (shown in FIG. 2) of passenger seat 108 relative to Earth. Seat back orientation sensor 122 may be any sensing device that enables seat back system 120 to function as described herein. In one implementation, seat back system 120 includes a plurality of seat back orientation sensors 122 including a gyroscope 124, an accelerometer 126, and a magnetometer 128. Gyroscope 124 senses orientation relative to Earth as a function of gyroscopic precession, accelerometer 126 senses orientation relative to Earth as a function of a change in capacitance of a moving mass, and magnetometer 128 senses orientation relative to Earth as a function of a sensed magnetic strength and polarity. Seat back orientation sensors 122 may be used alone or in combination to determine the orientation of seat back 114 relative to Earth.

Seat back system 120 also includes a control unit 130 in communication with seat back orientation sensors 122, and a memory device 132 in communication with control unit 130. Control unit 130 may include one or more processing units (e.g., in a multi-core configuration) and/or include a cryptographic accelerator (not shown). Control unit 130 is programmable to perform one or more operations described herein. For example, control unit 130 may be programmed by encoding an operation as executable instructions and providing the executable instructions in memory device 132.

Control unit 130 may include, but is not limited to, a general purpose central processing unit (CPU), a microcontroller, a microprocessor, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by control unit 130, cause control unit 130 to perform at least a portion of the functions described herein. The above examples are exemplary only, and thus are not intended to limit in any way the definition and/or meaning of the term processor.

Memory device 132 is one or more devices that enable information such as executable instructions and/or other data to be stored and retrieved. Memory device 132 may include one or more computer-readable media, such as, without limitation, dynamic random access memory (DRAM), synchronous dynamic random access memory (SDRAM), static random access memory (SRAM), a solid state disk, and/or a hard disk. Memory device 132 may be configured to store, without limitation, executable instructions, operating systems, applications, resources, installation scripts and/or any other type of data suitable for use with the methods and systems described herein.

Instructions for operating systems and applications are located in a functional form on a non-transitory memory device 132 for execution by control unit 130 to perform one or more of the processes described herein. These instructions in the different implementations may be embodied on different physical or tangible computer-readable media, such as memory device 132 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory.

In the exemplary implementation, seat back system 120 further includes a transmitter 134 and a battery 136. Transmitter 134 includes a wireless radio device 138 in communication with control unit 130, and an antenna 140 in communication with wireless radio device 138. Wireless radio device 138 facilitates converting data processed by control unit 130 for wireless transmission, and antenna 140 facilitates broadcasting the data, as will be explained in more detail below. Battery 136 that facilitates powering seat back system 120, and enables seat back system 120 to be easily installed on seat back 114 and within vehicle 100. As such, battery 136 provides each seat back system 120 with an independent power source. In an alternative implementation, seat back system 120 is hardwired to a power source within vehicle 100, or is powered by an energy-harvesting device.

Figure 4:
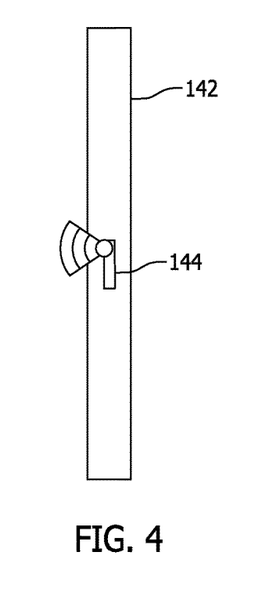
FIG. 4 is a side view illustration of an exemplary stationary object that may be in the vehicle shown in FIG. 1.

FIG. 4 is a side view illustration of an exemplary stationary object 142 that may be in vehicle 100 (shown in FIG. 1). In the exemplary implementation, stationary object 142 is an object affixed within vehicle 100 to prevent rotational and/or translational movement thereof. For example, stationary object 142 may be a stringer or longeron within fuselage 102 (shown in FIG. 1) of vehicle 100. Stationary object 142 has a reference orientation system 144 coupled thereto. By coupling reference orientation system 144 at a fixed position within vehicle 100, reference orientation system 144 is capable of determining an orientation of vehicle 100 relative to Earth, as will be explained in more detail below.

Figure 5:
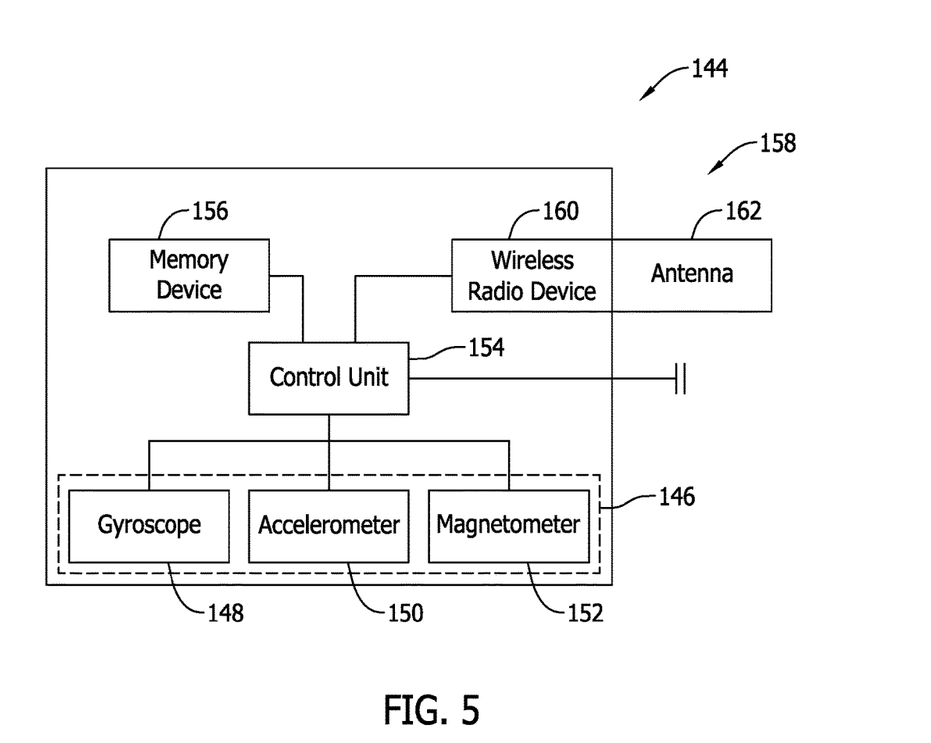
FIG. 5 is a box diagram illustrating an exemplary reference orientation system that may be used with the stationary object shown in FIG. 4.

FIG. 5 is a box diagram illustrating reference orientation system 144. In the exemplary implementation, reference orientation system 144 includes at least one reference orientation sensor 146 used to determine an orientation of vehicle 100 (shown in FIG. 1) relative to Earth. Reference orientation sensor 146 may be any sensing device that enables reference orientation system 144 to function as described herein. In one implementation, reference orientation system 144 includes a plurality of reference orientation sensors including a gyroscope 148, an accelerometer 150, and a magnetometer 152.

Reference orientation system 144 also includes a control unit 154 in communication with reference orientation sensors 146, and a memory device 156 in communication with control unit 154. It should be understood that the description of control unit 130 and memory device 132 (both shown in FIG. 3) above is applicable to control unit 154 and memory device 156 as well. Reference orientation system 144 further includes a transmitter 158 including a wireless radio device 160 in communication with control unit 154, and an antenna 162 in communication with wireless radio device 160. Wireless radio device 160 facilitates converting data processed by control unit 154 for wireless transmission, and antenna 162 facilitates broadcasting the data, as will be explained in more detail below. In addition, in one implementation, reference orientation system 144 is hardwired to a power source within vehicle 100. As such, reference orientation system 144 is capable of monitoring the orientation of vehicle 100 on a continuous basis.

Figure 6:
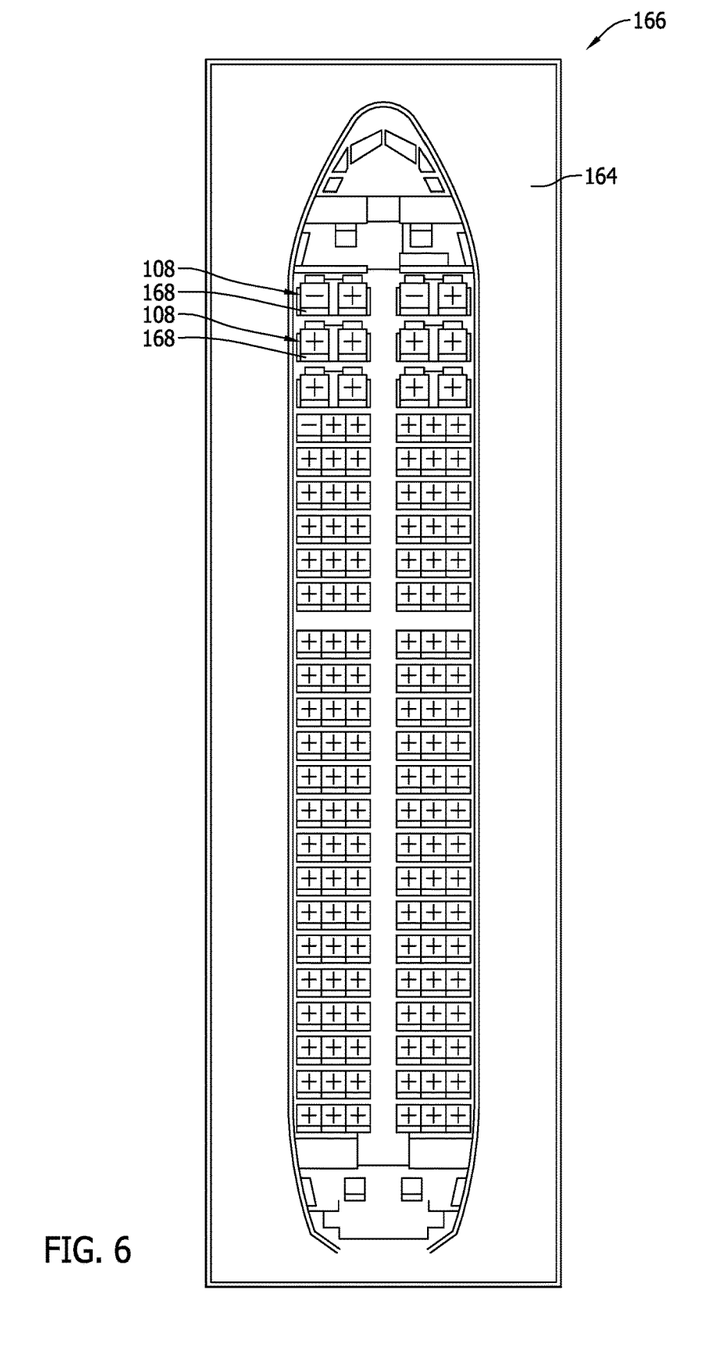
FIG. 6 is an illustration of an exemplary display of a remote monitoring unit that may be used in the vehicle shown in FIG. 1.

FIG. 6 is an illustration of an exemplary display 164 of a remote monitoring unit 166 that may be used in vehicle 100 (shown in FIG. 1). In the exemplary implementation, remote monitoring unit 166 displays a seat layout diagram including an indicium 168 for each passenger seat 108. Remote monitoring unit 166 is in communication with seat back system 120 (shown in FIG. 2) coupled to each passenger seat 108, and remote monitoring unit 166 receives seat back orientation data and health status data from the plurality of seat back systems 120. As noted above, seat back systems 120 facilitate determining a seat back orientation of each passenger seat 108, and a health status of each passenger seat 108. As such, remote monitoring unit 166 displays different notifications on indicium 168 for each passenger seat 108 based on the type of data received. For example, the data may include actual orientation data or actual health status data, as will be explained in more detail below, or the data may include a command for remote monitoring unit 166 to display the different notifications.

Any notification may be provided on display 164 that enables remote monitoring unit 166 to function as described herein. For example, in one embodiment, a notification (e.g., represented by a "+" symbol) is displayed on indicium 168 of a corresponding passenger seat 108 in the diagram when a seat back of the corresponding passenger seat 108 is fully upright, and a notification (e.g., represented by a "−" symbol) is displayed on indicium 168 when a seat back is not fully upright. In addition, a notification (e.g., represented by a first color) is displayed on indicium 168 when a health status of a seat back is determined to be normal, and a notification (e.g., represented by a second color different than the first color) is displayed on indicium 168 when a health status of a seat back is determined to be abnormal. As such, a user is able to view the orientation status and the health status of each seat back within vehicle 100 at a centralized location in a quick and efficient manner.

In one embodiment, remote monitoring unit 166 is coupled to a stationary object within vehicle 100 at a location that is convenient for viewing by a user, such as a flight attendant. Alternatively, remote monitoring unit 166 is a handheld portable device.

Figure 7:
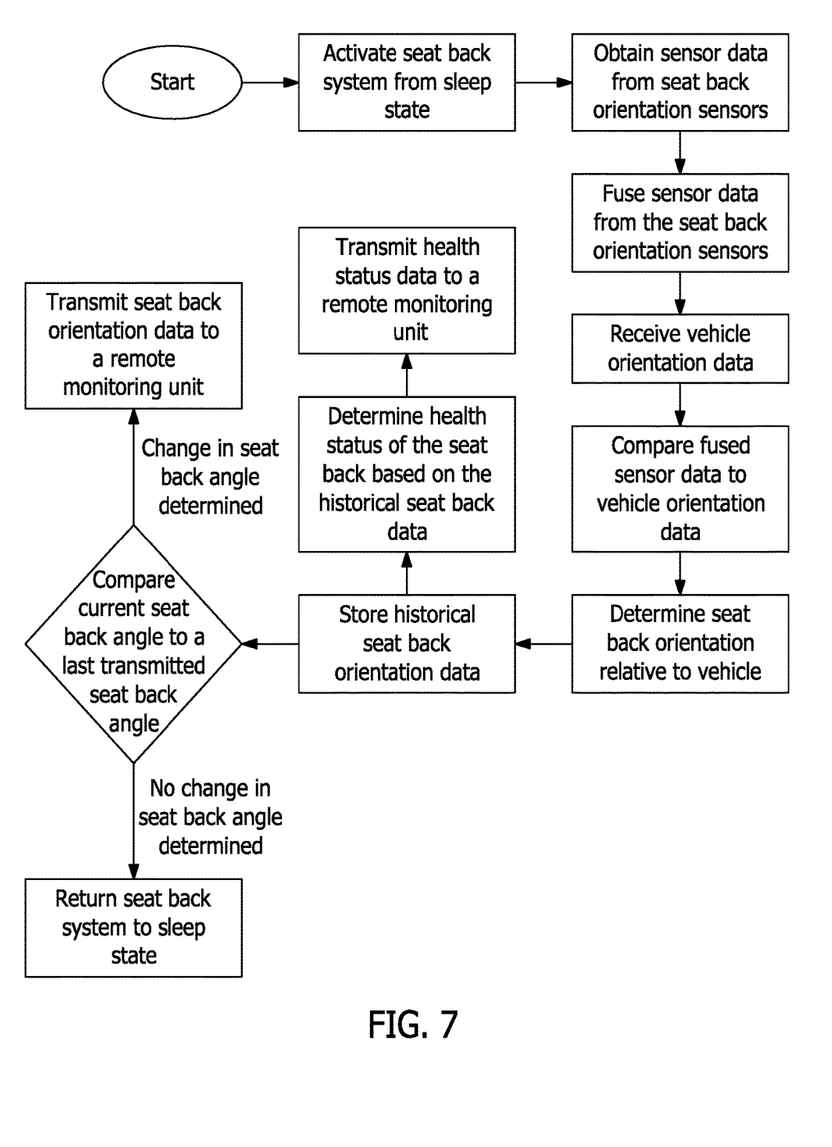
FIG. 7 is an illustration of an exemplary control diagram for use by the seat back system shown in FIG. 3.

FIG. 7 is an illustration of an exemplary control diagram for use by seat back system 120 (shown in FIG. 3). The control diagram illustrates an exemplary method of determining a seat back status of passenger seats 108 in vehicle 100 (shown in FIG. 1). In the exemplary implementation, the method includes activating seat back system 120, including seat back orientation sensors 122 (shown in FIG. 3), from a sleep state at predetermined intervals. The predetermined interval may be any duration in time that enables seat back system 120 to function as described herein. In one implementation, the predetermined interval is 5 seconds. As noted above, each seat back system 120 has its own independent power source. As such, periodically activating and then deactivating seat back system 120 facilitates conserving the energy of seat back system 120.

The method further includes monitoring at least one seat back orientation sensor 122 (shown in FIG. 3). More specifically, sensor data is obtained from seat back orientation sensor 122 and, in implementations where seat back system 120 includes a plurality of seat back orientation sensors 122, fuses sensor outputs from the plurality of seat back orientation sensors 122 to determine the orientation of each seat back 114 (shown in FIG. 2) relative to Earth. For example, in one implementation, fusing the sensor outputs facilitates determining seat back orientation data including a current seat back angle of each seat back 114.

The method further includes monitoring at least one reference orientation sensor 146 (shown in FIG. 5). More specifically, in the exemplary implementation, vehicle orientation data is received at seat back system 120, and seat back system 120 compares the fused sensor data from the plurality of seat back orientation sensors 122 to the vehicle orientation data to determine an orientation of each seat back 114 relative to vehicle 100. Historical seat back orientation data is stored for use in determining the orientation status and the health status of each seat back 114 within vehicle 100.

For example, when determining the orientation status of each seat back 114, seat back system 120 tracks and stores historical seat back orientation data including a last transmitted seat back angle of seat backs 114. That is, seat back system 120 tracks and stores the seat back angle of seat backs 114 that was determined in the most recent activation cycle of seat back system 120 during which a seat back orientation or seat back angle value was transmitted. The current seat back angle is then compared to the last transmitted seat back angle, and then one of two actions is executed. For example, when no change in seat back angle is determined based on the comparison, seat back system 120 does not transmit seat back orientation data to remote monitoring unit 166 (shown in FIG. 6) to minimize signal transmissions and use of battery power, and seat back system 120 is deactivated for return to the sleep state. When a change in seat back angle is determined based on the comparison, seat back system 120 transmits seat back orientation data to remote monitoring unit 166. As such, the seat back orientation data is only transmitted if a difference between the current and last transmitted seat back angles is determined such that remote monitoring unit 166 is updated only as needed to facilitate reducing transmission interference between the plurality of seat back systems 120 within vehicle 100.

When determining the health status of each seat back 114, seat back system 120 tracks and stores historical seat back orientation data including a number of times a seat back has been reclined in its lifetime, a number of times a seat back has been reclined within a predetermined time period, a continuous amount of time a seat back is in one of an upright position or a reclined position, or a rate of recline of a seat back from the upright position. Seat back system 120 determines the existence of an abnormal health status if the number of times a seat back has been reclined is greater than a predetermined threshold, if the number of times a seat back has been reclined within a predetermined time period is greater than a predetermined threshold, if a continuous amount of time a seat back is in one of an upright position or a reclined position is greater than a predetermined threshold, or if a rate of recline of a seat back from the upright position is greater than a predetermined threshold, which indicates that a seat back locking system has malfunctioned and the seat back is reclining without user intervention. If an abnormal health status is determined, seat back system 120 transmits health status data to remote monitoring unit 166.

Figure 8:
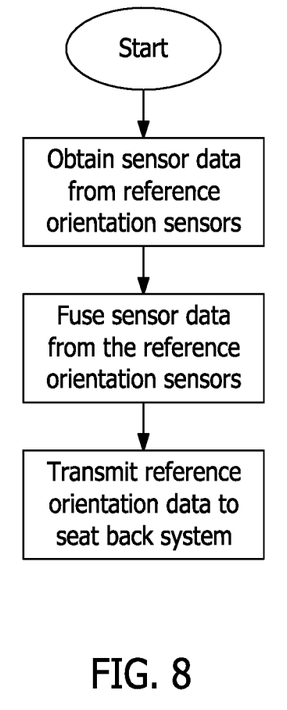
FIG. 8 is an illustration of an exemplary control diagram for use by the reference orientation system shown in FIG. 5.

FIG. 8 is an illustration of an exemplary control diagram for use by reference orientation system 144 (shown in FIG. 5). In the exemplary implementation, sensor data is obtained from reference orientation sensor 146 and, in implementations where reference orientation system 144 includes a plurality of reference orientation sensors 146, fuses sensor outputs from the plurality of reference orientation sensors 146 to determine the orientation of vehicle 100 (shown in FIG. 1) relative to Earth. Reference orientation system 144 then transmits reference orientation data to seat back system 120 (shown in FIG. 3) for further analysis, as described above.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of determining a seat back status of a passenger seat in a vehicle, the method comprising:
    monitoring at least one seat back orientation sensor coupled to a seat back of the passenger seat, the at least one seat back orientation sensor configured to determine an orientation of the seat back relative to Earth;
    monitoring at least one reference orientation sensor coupled at a fixed position within the vehicle, the at least one reference orientation sensor configured to determine an orientation of the vehicle relative to Earth;
    determining an orientation of the seat back relative to the vehicle based on a comparison between the orientation of the seat back and the orientation of the vehicle relative to Earth; and
    transmitting seat back orientation data, of the seat back relative to the vehicle, to a remote monitoring unit, wherein the remote monitoring unit is configured to display a first notification when the seat back is not fully upright.

2. The method in accordance with claim 1, wherein transmitting seat back orientation data comprises:
    storing historical seat back orientation data for the seat back, wherein the historical seat back orientation data includes a last transmitted seat back angle;
    comparing a current seat back angle to the last transmitted seat back angle; and
    transmitting the seat back orientation data only if a difference between the current seat back angle to the last transmitted seat back angle is determined.

3. The method in accordance with claim 1, wherein monitoring at least one seat back orientation sensor comprises activating the at least one seat back orientation sensor from a sleep state at predetermined intervals.

4. The method in accordance with claim 1, wherein the at least one seat back orientation sensor includes a plurality of seat back orientation sensors including an accelerometer, a magnetometer, and a gyroscope, wherein monitoring at least one seat back orientation sensor comprises fusing sensor outputs from the plurality of seat back orientation sensors to determine the orientation of the seat back relative to Earth.

5. The method in accordance with claim 1, wherein the at least one reference orientation sensor includes a plurality of reference orientation sensors including an accelerometer, a magnetometer, and a gyroscope, wherein monitoring at least one reference orientation sensor comprises fusing sensor outputs from the plurality of reference orientation sensors to determine the orientation of the vehicle relative to Earth.

6. The method in accordance with claim 1, wherein monitoring at least one reference orientation sensor comprises receiving vehicle orientation data at a control unit coupled to the seat back of the passenger seat.

7. The method in accordance with claim 1, wherein the vehicle includes a plurality of passenger seats, and each passenger seat includes a seat back having the at least one seat back orientation sensor coupled thereto, the method further comprising transmitting seat back orientation data, of each seat back relative to the vehicle, to a remote monitoring unit.

8. The method in accordance with claim 1 further comprising:
    storing historical seat back orientation data for the seat back; and
    determining a health status of the seat back based on the historical seat back orientation data.

9. The method in accordance with claim 8 further comprising transmitting health status data of the seat back to the remote monitoring unit, wherein the remote monitoring unit is configured to display a second notification when the health status of the seat back is abnormal.

10. The method in accordance with claim 9, wherein determining a health status of the seat back comprises determining an abnormal health status based on at least one of a number of times the seat back has been reclined, a number of times the seat back has been reclined within a predetermined time period, a continuous amount of time the seat back is in one of an upright position or a reclined position, or a rate of recline of the seat back from the upright position.

11. A system for use in determining a seat back status of a passenger seat in a vehicle, the system comprising:
- at least one reference orientation sensor configured for coupling at a fixed position within the vehicle, the at least one reference orientation sensor configured to determine an orientation of the vehicle relative to Earth;
- a seat back system configured for coupling to a seat back of the passenger seat, the seat back system comprising:
  - at least one seat back orientation sensor configured to determine an orientation of the seat back relative to Earth; and
  - a control unit in communication with the at least one seat back orientation sensor and the at least one reference orientation sensor, wherein the control unit is configured to determine an orientation of the seat back relative to the vehicle based on a comparison between the orientation of the seat back and the orientation of the vehicle relative to Earth; and
- a remote monitoring unit configured to receive seat back orientation data, of the seat back relative to the vehicle, from the control unit, wherein the remote monitoring unit is configured to display a first notification when the seat back is not fully upright.

12. The system in accordance with claim 11, wherein the seat back system further comprises a memory device in communication with the control unit, the memory device configured to store historical seat back orientation data for the seat back.

13. The system in accordance with claim 12, wherein the control unit is further configured to determine a health status of the seat back based on the historical seat back orientation data, and wherein the remote monitoring unit is further configured to display a second notification when the health status of the seat back is abnormal.

14. The system in accordance with claim 11 further comprising a transmitter in communication with the control unit, wherein the transmitter is configured to facilitate communication between the seat back system and the remote monitoring unit.

15. The system in accordance with claim 11, wherein the at least one reference orientation sensor and the at least one seat back orientation sensor each comprise a plurality of sensors comprising an accelerometer, a magnetometer, and a gyroscope.

16. The system in accordance with claim 11, wherein the seat back system is battery-powered.

17. A vehicle comprising:
- a stationary object;
- at least one reference orientation sensor coupled to the stationary object, the at least one reference orientation sensor configured to determine an orientation of the vehicle relative to Earth;
- a plurality of passenger seats that each comprise a seat bottom and a seat back that is rotatable relative to the seat bottom;
- a seat back system coupled to the seat back of each passenger seat, the seat back system comprising:
  - at least one seat back orientation sensor configured to determine an orientation of the seat back relative to Earth; and
  - a control unit in communication with the at least one seat back orientation sensor and the at least one reference orientation sensor, wherein the control unit is configured to determine an orientation of the seat back relative to the vehicle based on a comparison between the orientation of the seat back and the orientation of the vehicle relative to Earth; and
- a remote monitoring unit configured to receive seat back orientation data, of the seat back relative to the vehicle, from the control unit, wherein the remote monitoring unit is configured to display a first notification when the seat back is not fully upright.

18. The vehicle in accordance with claim 17, wherein the remote monitoring unit is configured to display a seat layout diagram including an indicium for each passenger seat, wherein the first notification is provided on the indicium that corresponds to the passenger seat having the seat back that is not fully upright.

19. The vehicle in accordance with claim 18, wherein the control unit is further configured to determine a health status of the seat back, and wherein the remote monitoring unit is further configured to display a second notification when the health status of the seat back is abnormal, the second notification provided on the indicium that corresponds to the passenger seat having the seat back with an abnormal health status.

20. The vehicle in accordance with claim 17, wherein each seat back system comprises an independent power source.

* * * * *